No. 632,554. Patented Sept. 5, 1899.
E. T. DUKES.
ARTIFICIAL BAIT.
(Application filed June 21, 1899.)

(No Model.)

WITNESSES
Jos. A. Ryan
Perry B. Turpin

INVENTOR
Edward T. Dukes
BY Munn & Co.
ATTORNEYS.

THE NORRIS PETERS CO., PHOTO-LITHO., WASHINGTON, D. C.

UNITED STATES PATENT OFFICE.

EDWARD T. DUKES, OF QUITMAN, GEORGIA, ASSIGNOR TO DUKES & CO., OF SAME PLACE.

ARTIFICIAL BAIT.

SPECIFICATION forming part of Letters Patent No. 632,554, dated September 5, 1899.

Application filed June 21, 1899. Serial No. 721,338. (No model.)

*To all whom it may concern:*

Be it known that I, EDWARD T. DUKES, of Quitman, in the county of Brooks and State of Georgia, have invented a new and useful Improvement in Artificial Bait, of which the following is a specification.

My invention is an improvement in artificial bait or minnows for use in fishing, and relates particularly to that class of such bait which seeks to provide a bait which when drawn through the water will simulate the movements of a minnow and so operate to entice the fish it is desired to catch.

The invention consists in certain novel constructions and combinations of parts, as will be hereinafter described, and pointed out in the claims.

Figure 1:
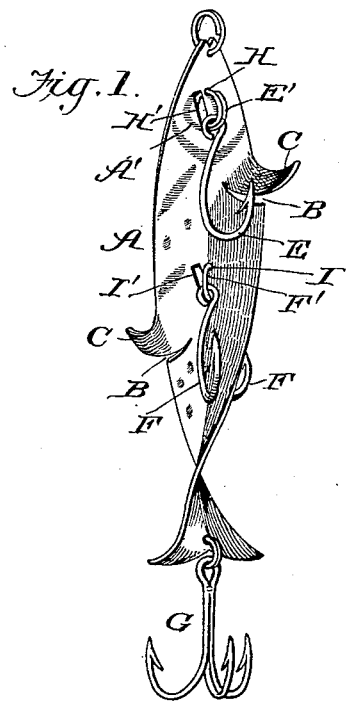
Figure 3:
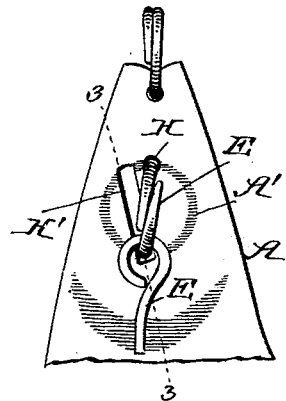
Figure 2:
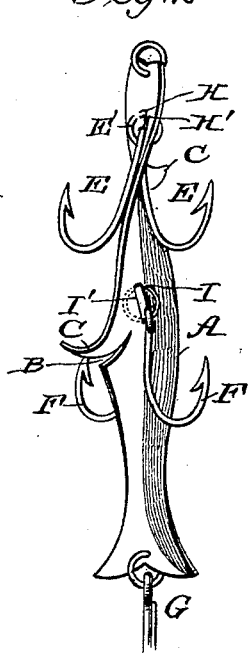
Figure 4:
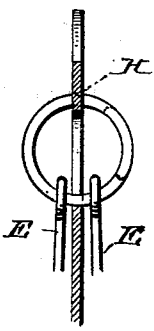

In the drawings, Figure 1 is a side view, and Fig. 2 is an edge view, of the bait. Fig. 3 is an enlarged side view of the head of the bait, and Fig. 4 is a detail section on about line 4 4 of Fig. 3.

The bait has a body A, of a thin plate of aluminium or other suitable material, whose edge contour resembles that of a minnow, and the plate is twisted spirally to insure its rapid rotation when drawn quickly through the water. The edge of the body is slitted at B, forming the fin-like portions C, which are deflected from the plane of the adjacent portions of the body A and aid as propellers in securing the desired rotation of the bait in the water. In practice I color and decorate the bait to make it more closely resemble a living fish.

In attaching the hooks I seek to so arrange and connect them as to offer the least possible resistance to the rotation of the spirally-twisted bait-body, to secure them so that they can be readily applied and removed at will, and to so arrange the means for securing the hooks near the head end of the body that it will present the appearance of an eye when the bait is rapidly revolved. To avoid retarding the rotation of the bait-body, I arrange the hooks in pairs, one on each side of the bait-body, and secure them to the latter on its axial line. By this means the hooks readily revolve as the body is rotated and permit the body to rotate evenly and swiftly, as desired.

In the construction shown I employ hooks E E, slightly in rear of the head end of the body, and hooks F F at about midway between the ends of the body; also, hooks G at the tail end thereof. The hooks E and F may be alike and secured in the same manner by the rings E' and F', also alike. The rings E' and F' are passed through openings H and I, formed through the body A, on the axial line thereof, and adjacent to these openings are the slots H' and I', which permit the play of the rings in inserting and removing the same and also under the strain of the victim when caught by either hook of the pair.

The rings E' and F' may be solid; but I prefer to make them in the form of split rings, as shown, as it facilitates the application, removal, and interchange of the hooks, as may be desired. The ring E' is located slightly in rear of the head end of the bait-body and being arranged axially and lying partly on opposite sides of the bait-body presents the appearance of the eye of a fish when the bait-body is rapidly rotated. This deceptive appearance is heightened by producing on both sides of the body A by suitable markings circles A', concentric with the ring E' and coöperating therewith in producing the eye effect when the bait is rotated.

The bait can be used as a troll, with a long line astern a boat or with a short line to play on the surface in front of a boat, as may be desired.

Having thus described my invention, what I claim as new, and desire to secure by Letters Patent, is—

1. An artificial bait having the body thereof formed from a flat piece of material and provided between its ends with an opening for the hook-securing ring, and adjacent to said opening with a slot for the play of said ring, the ring passed through said opening and projecting through the slot on opposite sides of the bait-body, and the hooks connected with said ring and lying on opposite sides of the bait-body substantially as set forth.

2. An artificial bait having the body thereof formed from a flat strip of metal twisted to insure its rotation when drawn through the water, and provided at a point slightly in rear of its head end, with a ring arranged on the axial line of the body and lying partly on opposite sides thereof whereby the said ring will simulate the eye of a fish when the bait is rotated, and the hooks arranged on opposite sides of the bait-body and carried by said ring substantially as set forth.

3. The artificial bait herein described consisting of the body composed of a thin plate twisted spirally and having its edges slitted forming the fin portions which are deflected from the plane of the adjacent portions of the body, the latter being provided with openings for the hook-holding rings and adjacent to said openings with slots, the lap-rings passed through said openings and playing in the adjacent slots, and the hooks secured by said rings and lying on opposite sides of the twisted body, the openings for the hook-holding rings being arranged in the axial line of the bait-body all substantially as and for the purposes set forth.

EDWARD T. DUKES.

Witnesses:
J. D. MORTON,
O. K. JELKS.